United States Patent
VanKirk et al.

[11] Patent Number: 5,904,337
[45] Date of Patent: May 18, 1999

[54] BALL VALVE SEAT AND SEAL APPARATUS AND ASSEMBLY METHOD

[75] Inventors: LeRoy VanKirk, White Pigeon, Mich.; William Eugene Ralstin, Cranger, Ind.

[73] Assignee: Prolon Inc., Elkhart, Ind.

[21] Appl. No.: 09/035,288

[22] Filed: Mar. 5, 1998

Related U.S. Application Data

[63] Continuation of application No. 08/688,760, Jul. 31, 1996, abandoned.

[51] Int. Cl.$^6$ ........................................... F16K 5/06
[52] U.S. Cl. ........................................ 251/315.14; 251/317
[58] Field of Search ..................... 251/315.14, 317; 29/890.124

[56] References Cited

U.S. PATENT DOCUMENTS

| | | | |
|---|---|---|---|
| 3,036,600 | 5/1962 | Vickery | 137/625.12 |
| 3,077,902 | 2/1963 | Vickery | 137/625.12 |
| 3,667,727 | 6/1972 | Bowden | 251/317 X |
| 3,698,687 | 10/1972 | Kitamura | 251/315 |
| 3,794,291 | 2/1974 | Suyama | 251/171 |
| 4,071,220 | 1/1978 | Iino | 251/174 |
| 4,099,705 | 7/1978 | Runyan | 251/174 |
| 4,262,691 | 4/1981 | Kacal | 137/315 |
| 4,718,444 | 1/1988 | Boelte | 137/15 |
| 4,762,301 | 8/1988 | Wozniak et al. | 251/171 |
| 4,953,587 | 9/1990 | Steele | 137/315 |
| 5,170,989 | 12/1992 | Kemp | 251/174 |
| 5,263,685 | 11/1993 | Winnike et al. | 251/316 |

FOREIGN PATENT DOCUMENTS 1426519 3/1976 WIPO.

*Primary Examiner*—John Fox
*Attorney, Agent, or Firm*—Woodard, Emhardt, Naughton Moriarty & McNett

[57] ABSTRACT

A resilient cylindrical seat ring and pocket apparatus for supporting and sealing a valve ball in a valve body.

A method for creating and energizing a seal between an annular valve seat and a valve ball during the assembly of a valve apparatus. The valve body of the valve apparatus includes an annular valve body seat pocket. The annular valve seat is seated within the annular valve body seat pocket as the valve ball is positioned on an inner diameter corner of the annular valve seat. Next, the valve ball is forced on the inner diameter corner causing the inner diameter surface of annular valve seat to contact and conform to the valve ball. As a result, the inner diameter surface of the annular valve seat is sealed to the valve ball. The seal is energized from the resiliency of the annular valve seat. The seal is further energized from the interaction between the annular valve seat and the annular valve body seat pocket.

18 Claims, 13 Drawing Sheets

BALL VALVE SEAT AND SEAL APPARATUS AND ASSEMBLY METHOD

This is a continuation of application Ser. No. 08/688,760, filed Jul. 31, 1996, now abandoned.

FIELD OF THE INVENTION

The present invention relates generally to a ball seat and seal apparatus and to a method for creating and energizing a seal between an annular valve seat and a valve ball.

BACKGROUND OF THE INVENTION

FIG. 1 is a cross-sectional view of a prior art assembled valve apparatus 1 having a sealing surface 3a of annular valve seat 2a sealed to a valve ball 4, and a sealing surface 3b of an annular valve seat 2b sealed to valve ball 4. The following discussion, while directed to an annular valve seat 2a, applies equally to an annular valve seat 2b. In order to facilitate a seal between sealing surface 3a and valve ball 4, sealing surface 3a is machined on annular valve seat 2a prior to the assembly of valve apparatus 1. As a result, when valve apparatus 1 is assembled, sealing surface 3a will contact and seal with valve ball 4. FIGS. 2A and 2B are illustrative of a design of sealing surface 3a.

Referring back to FIG. 1, when valve apparatus 1 is assembled, pressure applied from valve ball 4 to sealing surface 3a energizes the seal between sealing surface 3a and valve ball 4. In order to maintain an energetic seal between sealing surface 3a and valve ball 4 over the life of valve apparatus 1, it is essential that sealing surface 3a applies an opposing pressure to valve ball 4. To provide sealing surface 3a with such an opposing pressure, valve apparatus 1 further includes an o-ring energizer 5a placed in an annular valve body pocket 7 of valve body 6. O-ring energizers 5a and 5b, and annular valve body pockets 7a and 7b are shown.

The following discussion, while directed to o-ring energizer 5a and annular valve body pocket 7a, applies equally to o-ring energizer 5b and annular valve body pocket 7b.

As valve apparatus 1 is assembled, o-ring energizer 5a is flattened within annular valve body pocket 7a. O-ring energizer 5a is made of resilient material, and as a result, o-ring energizer 5a wants to return to its original shape. The energy used by o-ring energizer 5a in its attempt to return to its original shape is provided to annular valve seat 2a, which in turn applies this energy as an opposing pressure along sealing surface 3a to valve ball 4. Thus, the seal between sealing surface 3a and valve ball 4 is further energized and can be maintained over the life of valve apparatus 1. FIGS. 3 and 4 are illustrative of the pre-assembled position and the assembled position of valve seat 2a, valve ball 4 and o-ring energizer 5a.

FIG. 1 is a generic drawing of a prior art valve apparatus, while U.S. Pat. Nos. 3,794,291, 4,099,705, 4,262,691, 4,718,444, 4,953,587, 5,170,989, and 5,263,685, are specific examples of valve apparatuses including annular valve seats having a pre-designed sealing surfaces and o-ring energizers. In some cases, springs are utilized. While these prior art annular valve seats are effective, such prior art annular valve seats involve multiple components and secondary operations in order to shape a sealing surface on the annular valve seat. The apparatus is highly specialized and directed to specific needs. In addition, the prior art annular valve seats are not designed to be self-energizing. Thus, o-ring energizers and/ or springs must be utilized, and this also adds to the cost of the valve apparatus. Therefore, there is a need to provide an economical method for creating and energizing a seal between an annular valve seat and a valve ball.

SUMMARY OF THE INVENTION

The present invention addresses the need described in the BACKGROUND section. In one aspect of the present invention, the assembly of a valve apparatus involves seating an annular valve seat within an annular valve body seat pocket and conforming an inner diameter surface of the annular valve seat by forcing the valve ball onto the inner diameter surface. In another aspect of the present invention, the annular valve seat is manufactured to be self-energizing during the creation and life of the seal between the annular valve seat and the valve ball. In another aspect of the present invention, the design of the annular valve body seat pocket provides additional energy to the seal between the annular valve seat and the valve ball.

It is an object of the present invention to eliminate the need for secondary operations on a sealing surface on an annular valve seat.

It is another object of the present invention to eliminate the need for o-ring energizers, springs, and/or other means for energizing the seal between the annular valve seat and the valve ball.

The above and other objects, features and advantages of the present invention will be made more apparent by the following description of a preferred embodiment of the present invention with reference to the accompanying drawings.

BRIEF DESCRIPTION OF THE DRAWINGS

FIG. 2b is a perspective, partial cross-sectional view of the prior art annular valve seat of FIG. 2a;

FIG. 5b is a perspective, partial cross-sectional view of the annular valve seat of FIG. 5a;

DESCRIPTION OF THE PREFERRED EMBODIMENT

Figure 1:
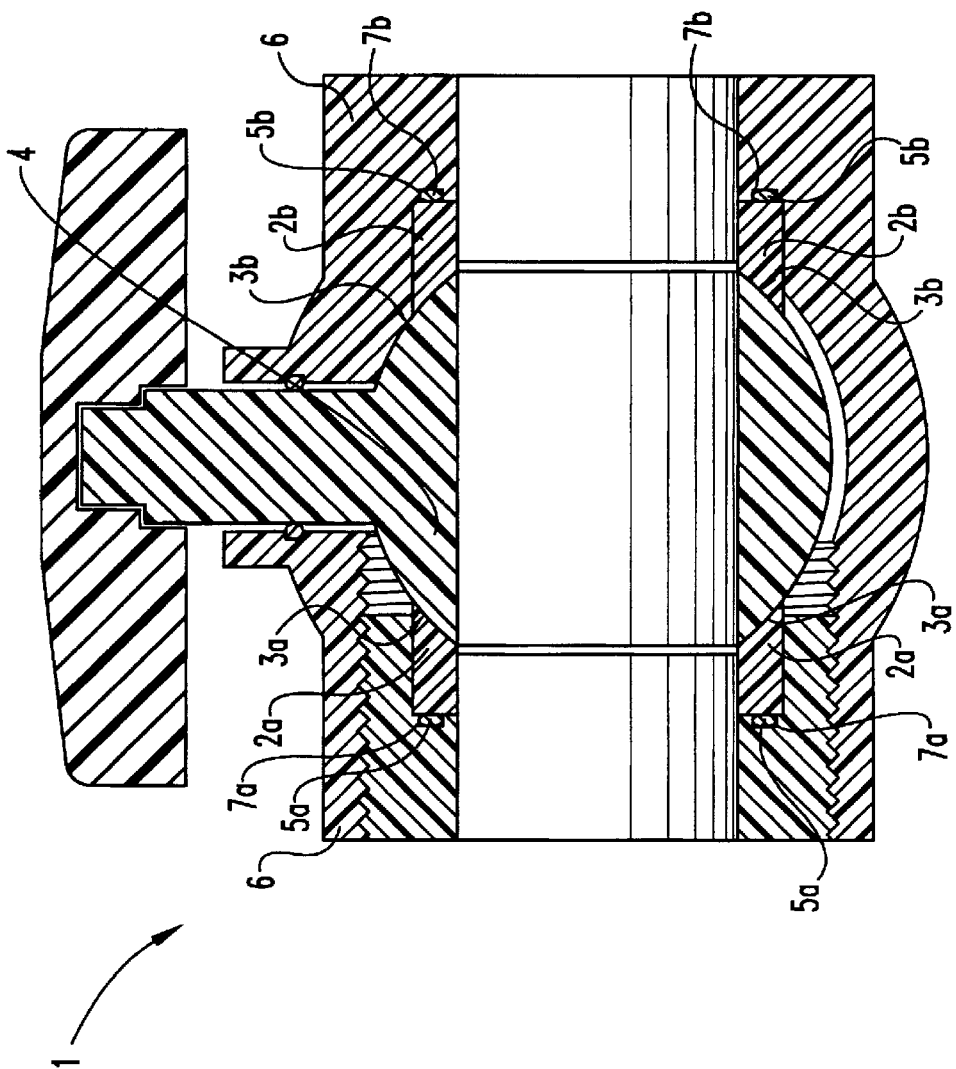
FIG. 1 is a cross-sectional view of an assembled prior art valve apparatus.
Figure 2A:
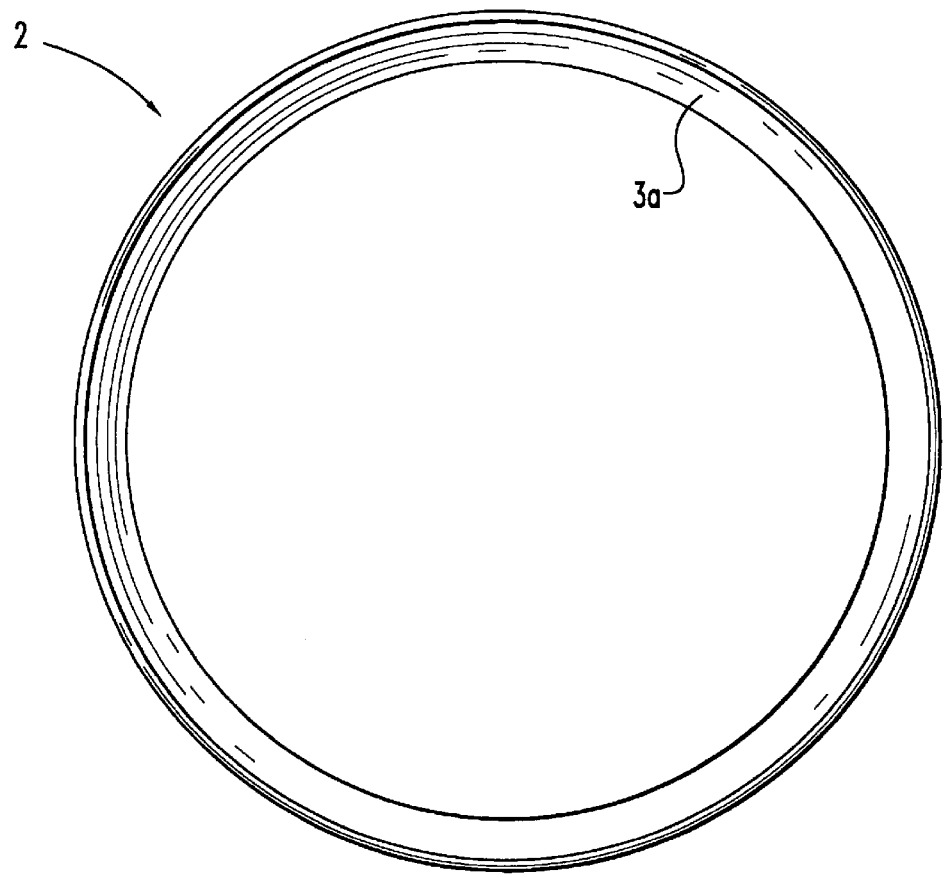
FIG. 2a is a top plan view of a prior art annular valve seat.
Figure 2B:
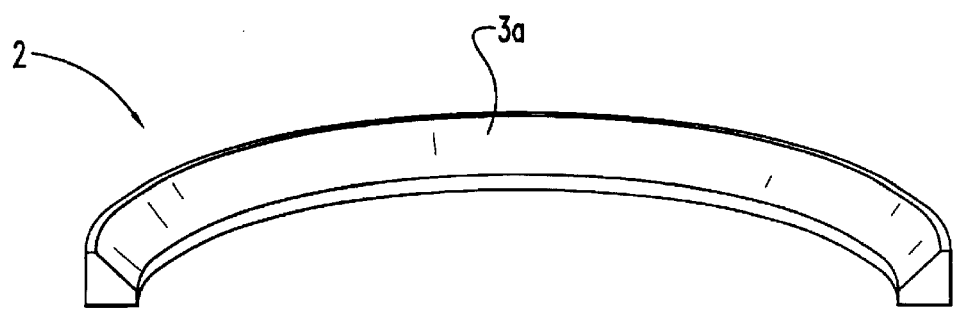
Figure 3:
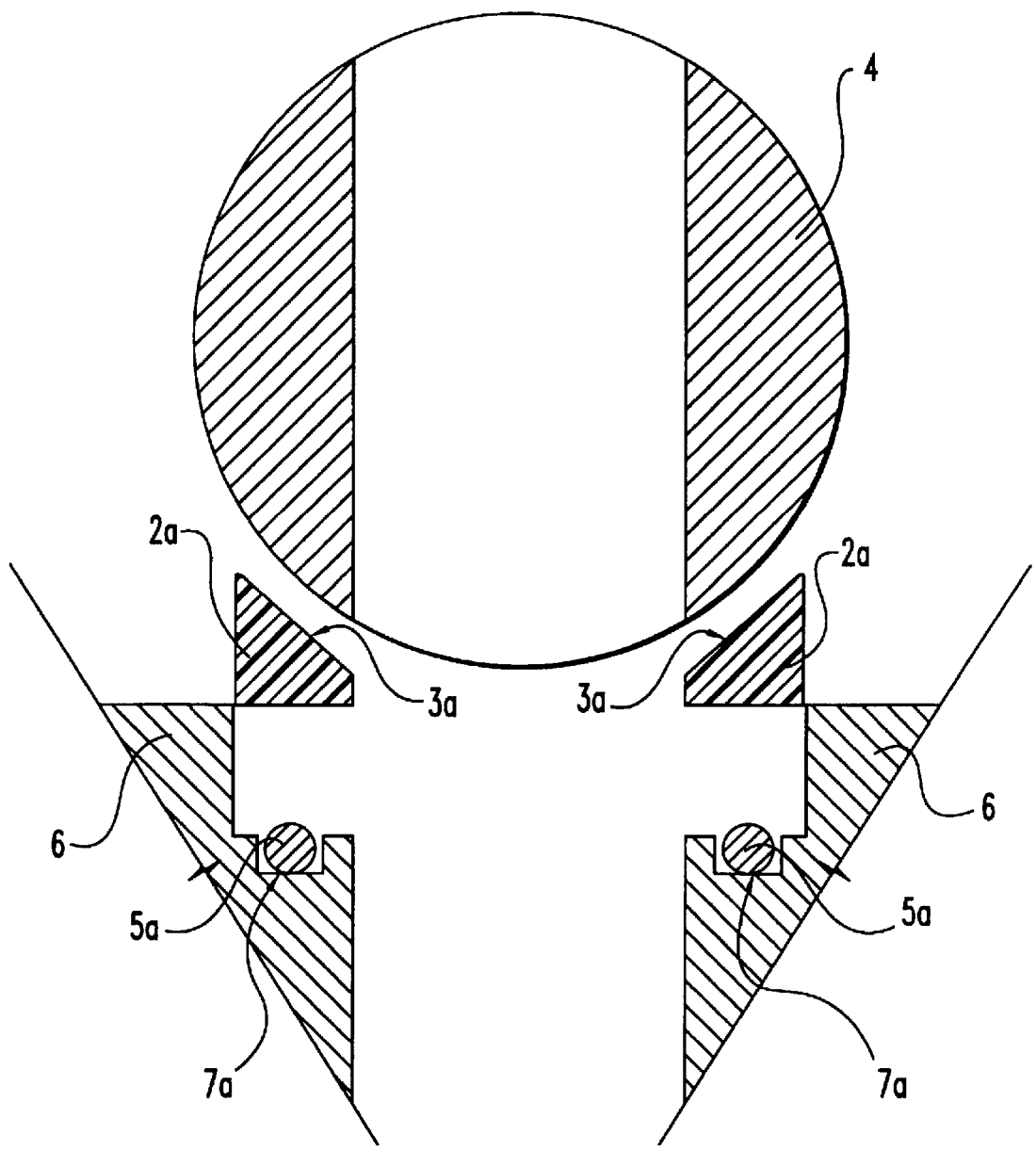
FIG. 3. is a partial, cross-sectional view of a pre-assembled position of the prior art valve apparatus of FIG. 1.

For the purposes of promoting an understanding of the principles of the present invention, reference will now be made to the embodiment illustrated in the drawings and specific language will be used to describe the same. It will nevertheless be understood that no limitation of the scope of the present invention is thereby intended, such alterations and further modifications in the illustrated apparatus, and such further applications of the principles of the present invention as illustrated therein being contemplated as would normally occur to one skilled in the art to which the present invention relates.

Figure 4:
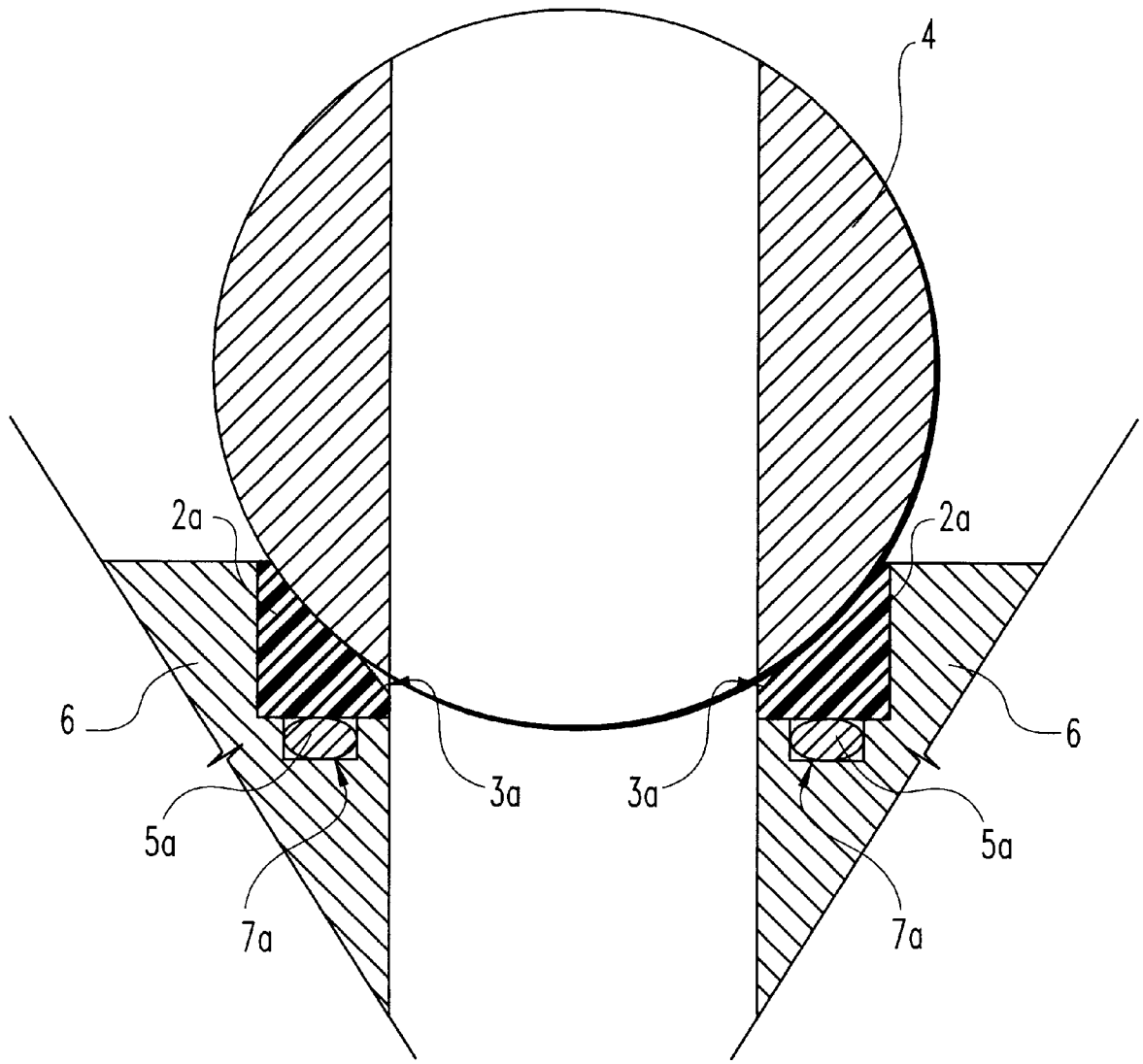
FIG. 4 is a partial, cross-sectional view of an assembled position of the prior art valve apparatus of FIG. 1.

One of the primary inventive concepts of the present invention is the development of a cylindrical annular valve seat to replace the prior art annular valve seats having pre-formed sealing surfaces. The results of the effort put into the development of a cylindrical annular valve seat was a new method of assembling a valve apparatus wherein the cylindrical annular valve seat conformed, i.e. sealed, to the valve ball during the assembly of the valve apparatus. The development of the cylindrical annular valve seat is significant for a couple of reasons. First, an advantage of the cylindrical annular valve seat conforming to the valve ball during the assembly of the valve apparatus is the creation of a matched seal between the valve ball and the cylindrical annular valve seat. A matched seal is a more effective than a contact seal demonstrated in FIG. 4. Second, the cylindrical annular valve seat does not require a sealing surface to be preformed on the cylindrical annular valve seat, and as a consequence, the one piece cylindrical annular valve seat is more economical than the prior art annular valve seat having a preformed sealing surface and multiple components.

Figure 5A:
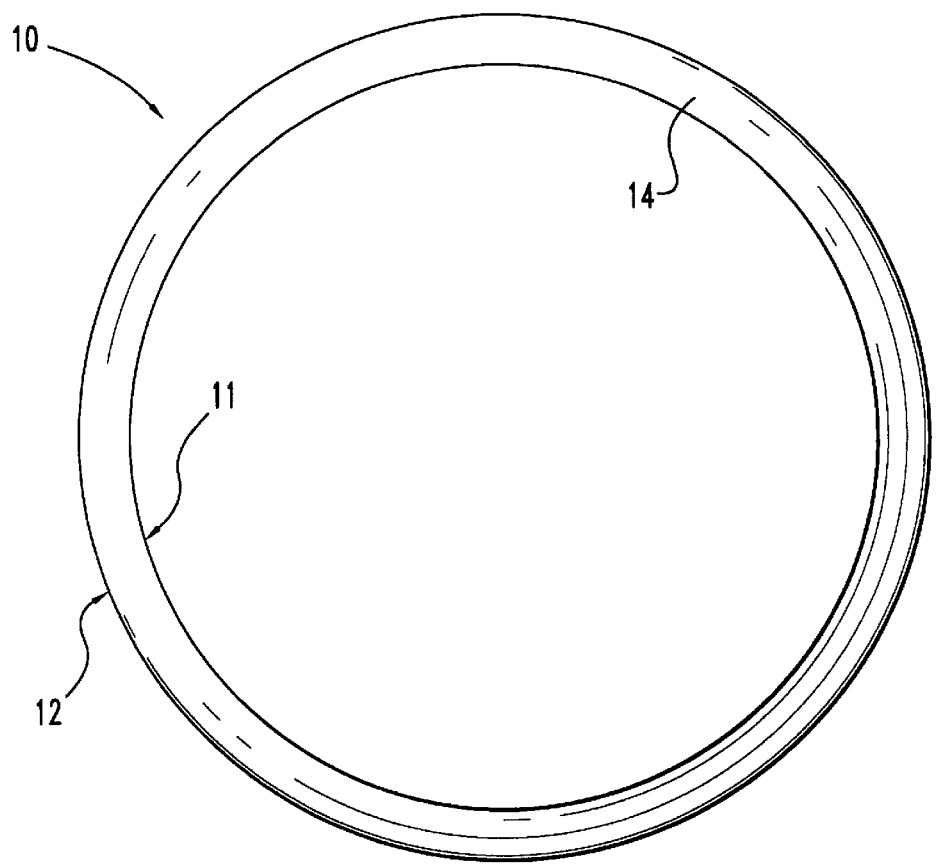
FIG. 5a is a top plan view of an annular valve seat in accordance with the present invention.
Figure 5B:
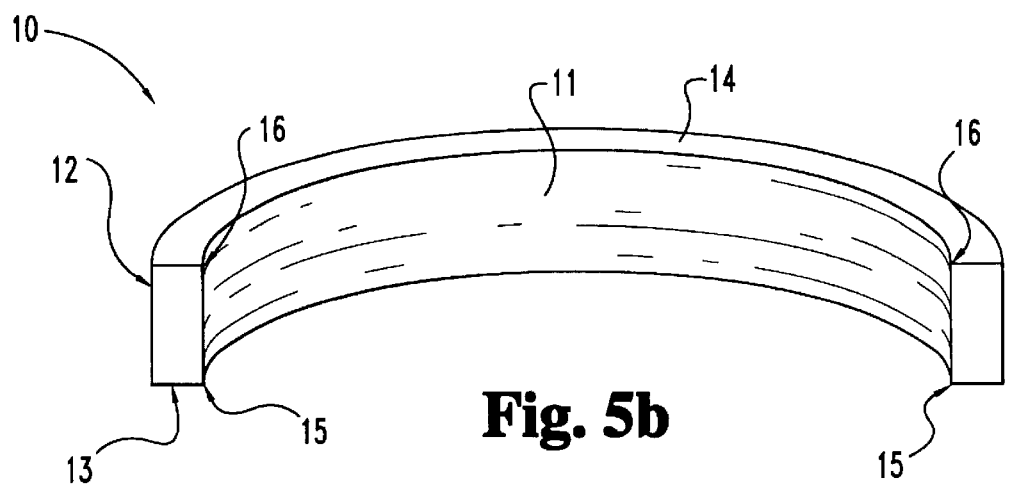

FIG. 5a is a top plan view of an annular valve seat 10 and FIG. 5b is a perspective view, partially in cross-section, of annular valve seat 10. Annular valve seat 10 is manufactured in accordance with the cylindrical annular valve seat design of the present invention. Referring to both FIG. 5a and FIG. 5b, annular valve seat 10 includes an inner diameter surface 11, an outer diameter surface 12, a first side surface 13, a second side surface 14, a first inner diameter corner 15 and a second inner diameter corner 16. Preferably, first inner diameter corner 15 and second inner diameter corner 16 are right angled corners. However, the present invention contemplates that first inner diameter corner 15 and second inner diameter corner 16 may be angled at more or less than ninety degrees.

Another inventive concept of the present invention is to manufacture an annular valve seat 10 from resilient material in order for annular valve seat 10 to be self-energizing. Polytetrafluorethylene is resilient material that can maintain resiliency for a long period of time. Preferably, annular valve seat 10 is partially or fully manufactured from polytetrafluorethylene. However, the present invention contemplates that annular valve seat 10 can be manufactured from any kind of resilient material.

Figure 6:
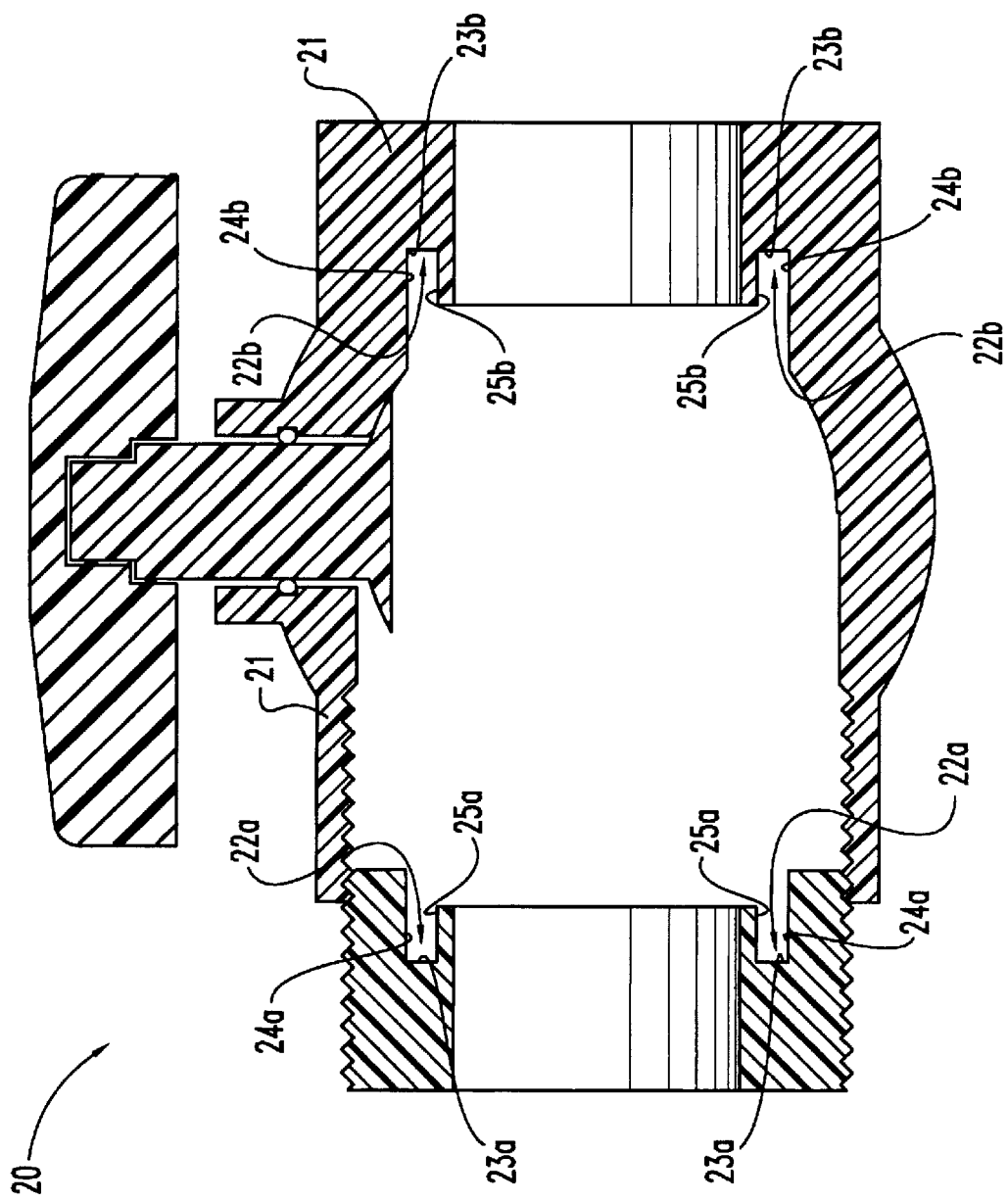
FIG. 6 is a cross-sectional view of an annular valve body seat pocket in accordance with the present invention.

Another inventive concept of the present invention is to design the valve body to include an annular valve body seat pocket in which to seat annular valve seat 10. FIG. 6 is a view of annular valve body seat pockets 22a and 22b machined in valve body 21 prior to the assembly of valve apparatus 20. Annular valve body seat pocket 22a includes floor 23a, outer wall 24a and inner wall 25a, while annular valve body seat pocket 22b includes floor 23b, outer wall 24b and inner wall 25b. One advantage of annular valve body seat pockets 22a and 22b is the extra energy annular valve body seat pockets 22a and 22b provide to the seal between annular valve seat 10 and a valve ball.

Figure 7:
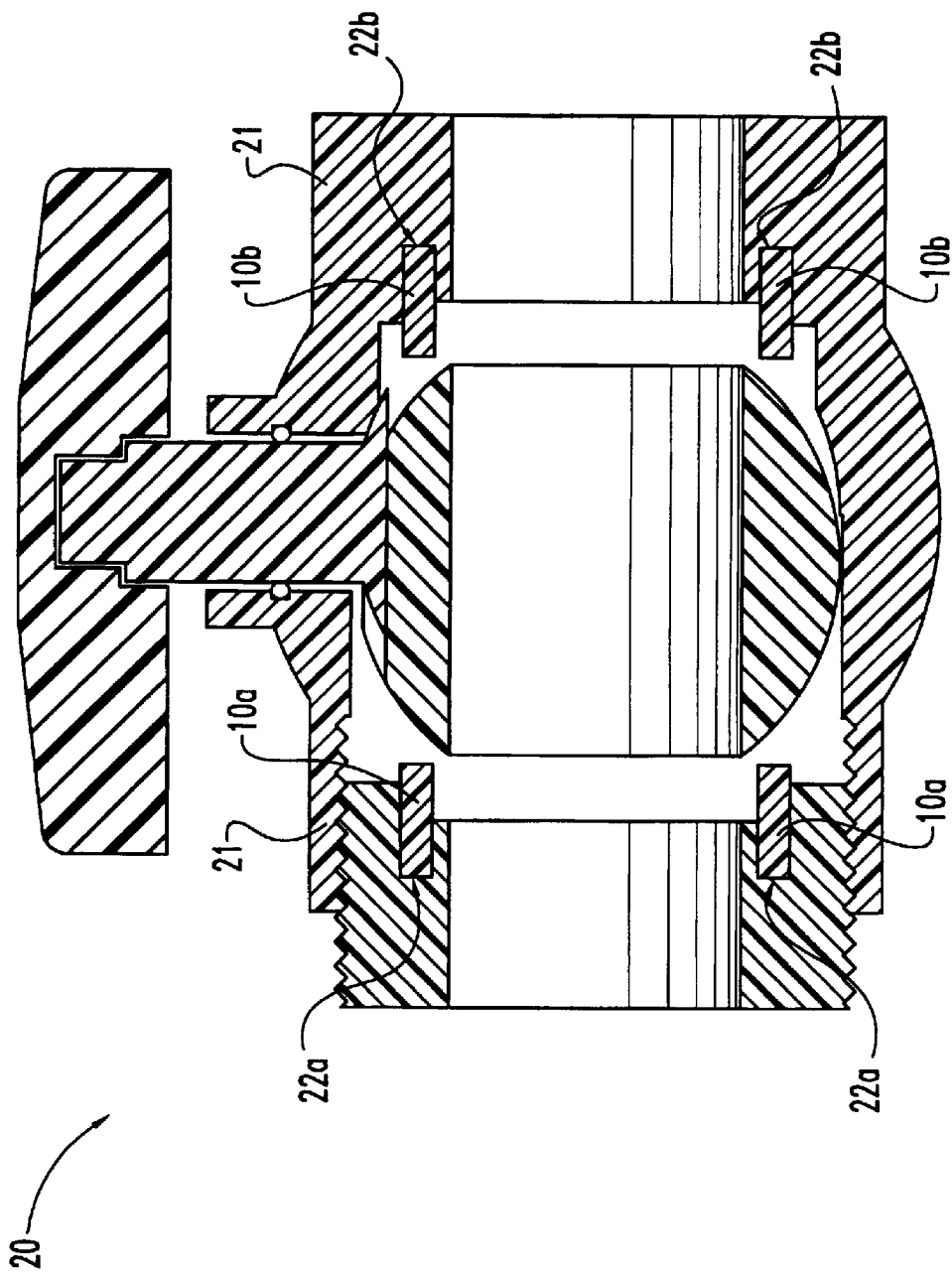
FIG. 7 is a cross-sectional view of a valve apparatus in accordance with the present invention at the beginning of the assembly of the valve apparatus.
Figure 8:
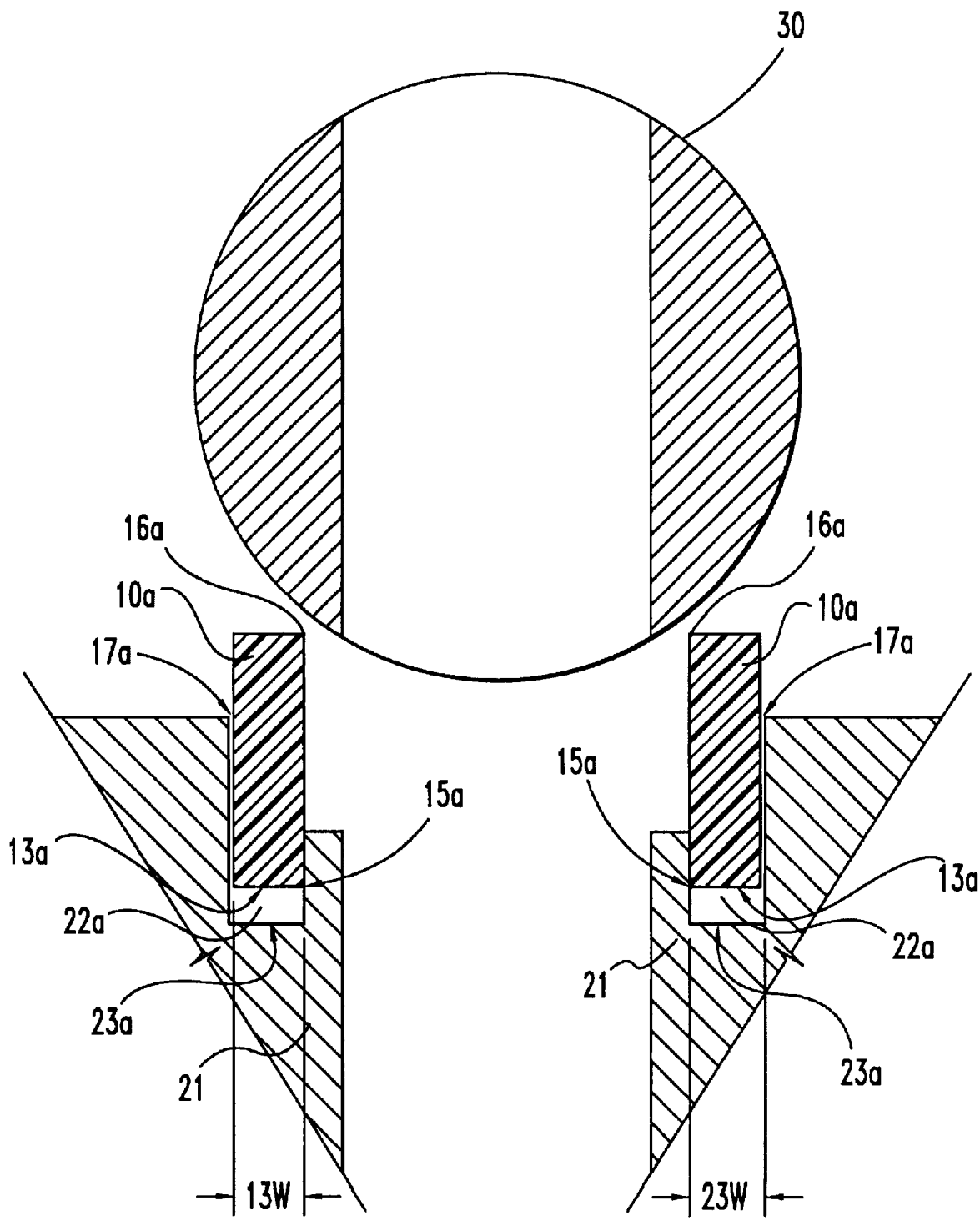
FIG. 8 is a partial view of the valve apparatus of FIG. 7.

FIGS. 7 through 13 will be used to describe the assembly of valve apparatus 20 in accordance with the present invention. FIGS. 7 and 8 are illustrative of one essential step in assembling valve apparatus 20. FIG. 7 is a cross-sectional view of valve apparatus 20 having annular valve seat 10a seated within annular valve body seat pocket 22a, and annular valve seat 10b seated within annular valve body seat pocket 22b. FIG. 8 is a cross-sectional view of second inner diameter corner 15a of annular valve seat 10a being seated in annular valve body seat pocket 22a. While FIG. 8 is directed to annular valve seat 10a and annular valve body seat pocket 22a, FIG. 8 applies equally to annular valve seat 10b and annular valve body seat pocket 22b. Referring to FIG. 8, the present invention contemplates that a width 13W of surface 13a of annular valve seat 10a is less than width 23W of floor 23a of annular valve body seat pocket 22a. This is demonstrated by gap 17a in FIG. 8. Thus, width 13W of surface 13a must be designed and manufactured with a measurement that is less than the measurement designed and manufactured for width 23W of floor 23a.

Figure 9:
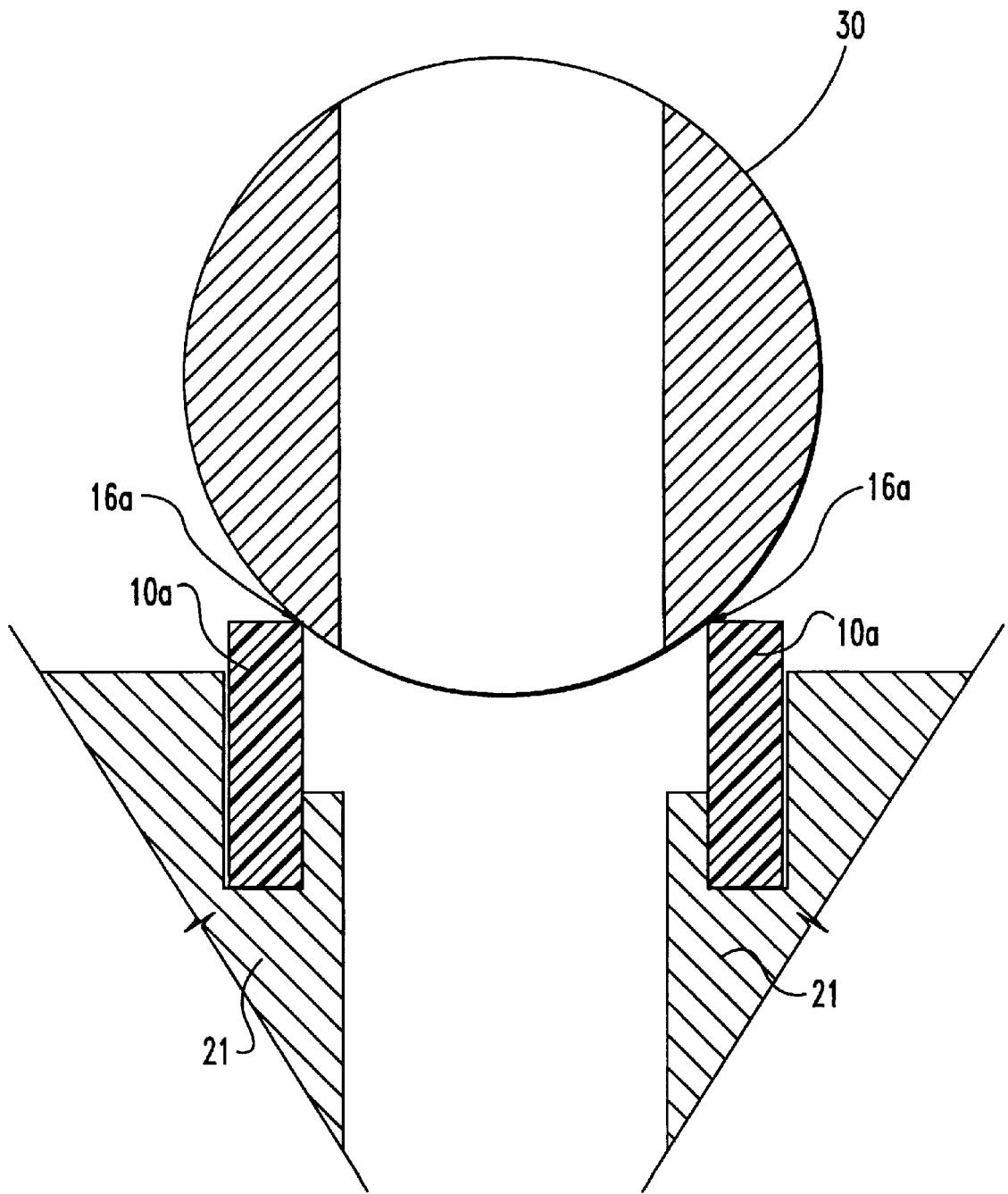
FIG. 9 is a partial view of the valve apparatus of FIG. 7 during the assembly of the valve apparatus.
Figure 10:
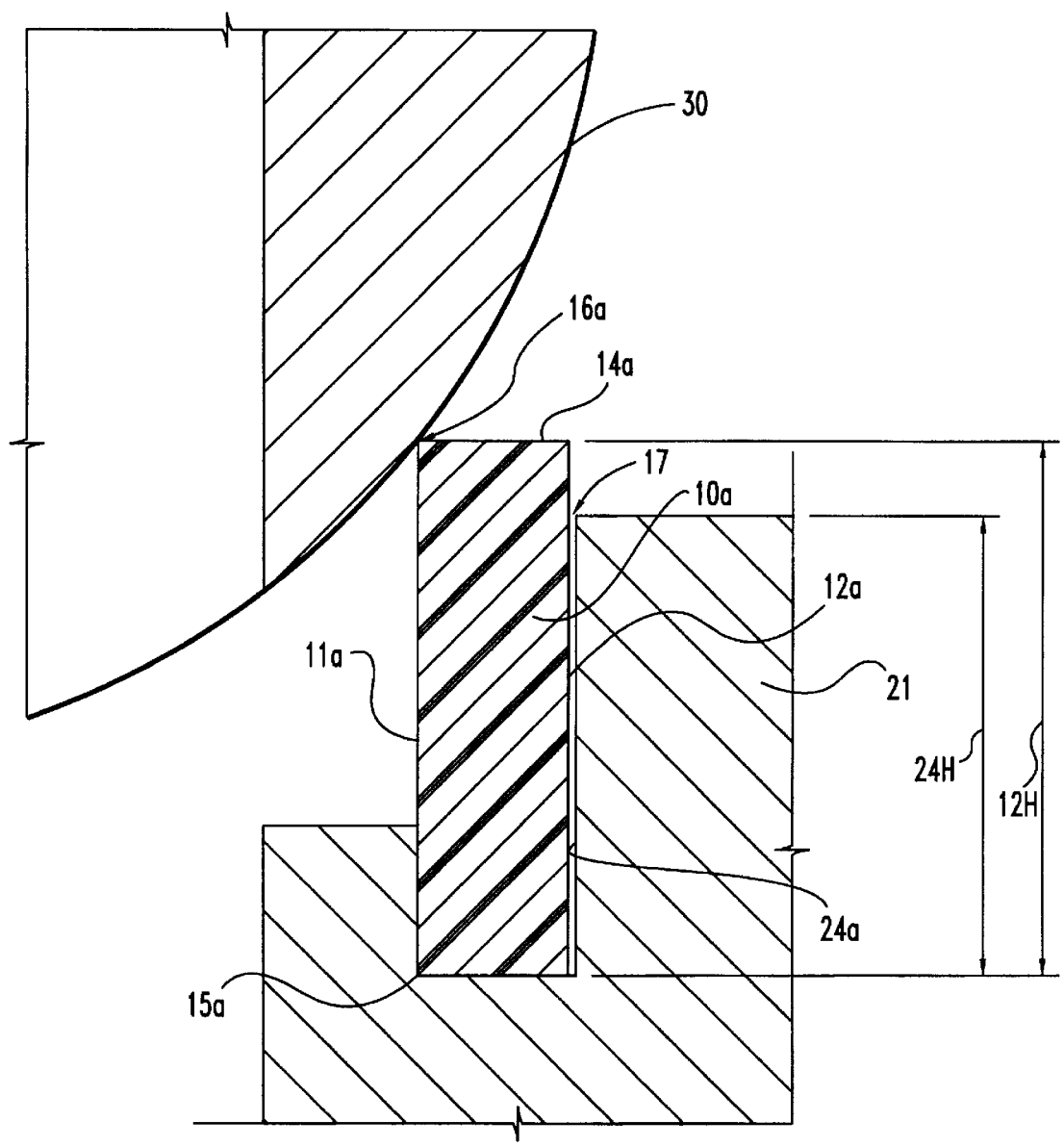
FIG. 10 is a zoom-in view of FIG. 9.

FIGS. 9 and 10 are illustrative of an additional step in assembling valve apparatus 20. FIG. 9 is a cross-sectional view of valve ball 30 being positioned on second inner diameter corner 16a of annular valve seat 10a, while FIG. 10 is a zoom-in view of FIG. 9. Referring to FIG. 10, the dimensional measurements of annular valve seat 10a and annular valve body seat pocket 22a must allow valve ball 30 to be positioned on second inner diameter corner 16a prior to sealing annular valve seat 10a to valve ball 30. It should be understood that valve ball 30 is substantially harder than the annular valve body seat 10a. It is important to note that the size of valve ball 30 can vary for a couple of reasons. First, as a result of the variations in the size of valve ball 30, the dimensional measurements of annular valve seat 10a will depend upon the size of valve ball 30. Therefore, based upon the size of valve ball 30, the dimensional measurements of annular valve seat 10a are designed and manufactured to ensure that valve ball 30 can be positioned on second inner diameter corner 16a prior to sealing annular valve seat 10a to valve ball 30.

Second, as previously stated, annular valve seat 10a is seated within annular valve body seat pocket 22a during the assembly of valve apparatus 20. As a consequence, because the dimensional measurements of annular valve seat 10a varies as the size of valve ball 30 varies, the dimensional measurements of annular valve body seat pocket 22a will depend upon the dimensional measurements of annular valve seat 10a. Therefore, based on the designed and manufactured dimensional measurements of annular valve seat 10a, the dimensional measurements of annular valve body seat pocket 22a are designed and manufactured to ensure that annular valve seat 10a can seat within annular valve body seat pocket 22a during the assembly of valve apparatus 20.

While FIGS. 9 and 10 are directed to annular valve seat 10a and annular valve body seat pocket 22a, FIGS. 9 and 10 apply equally to annular valve seat 10b and annular valve body seat pocket 22b.

Figure 11:
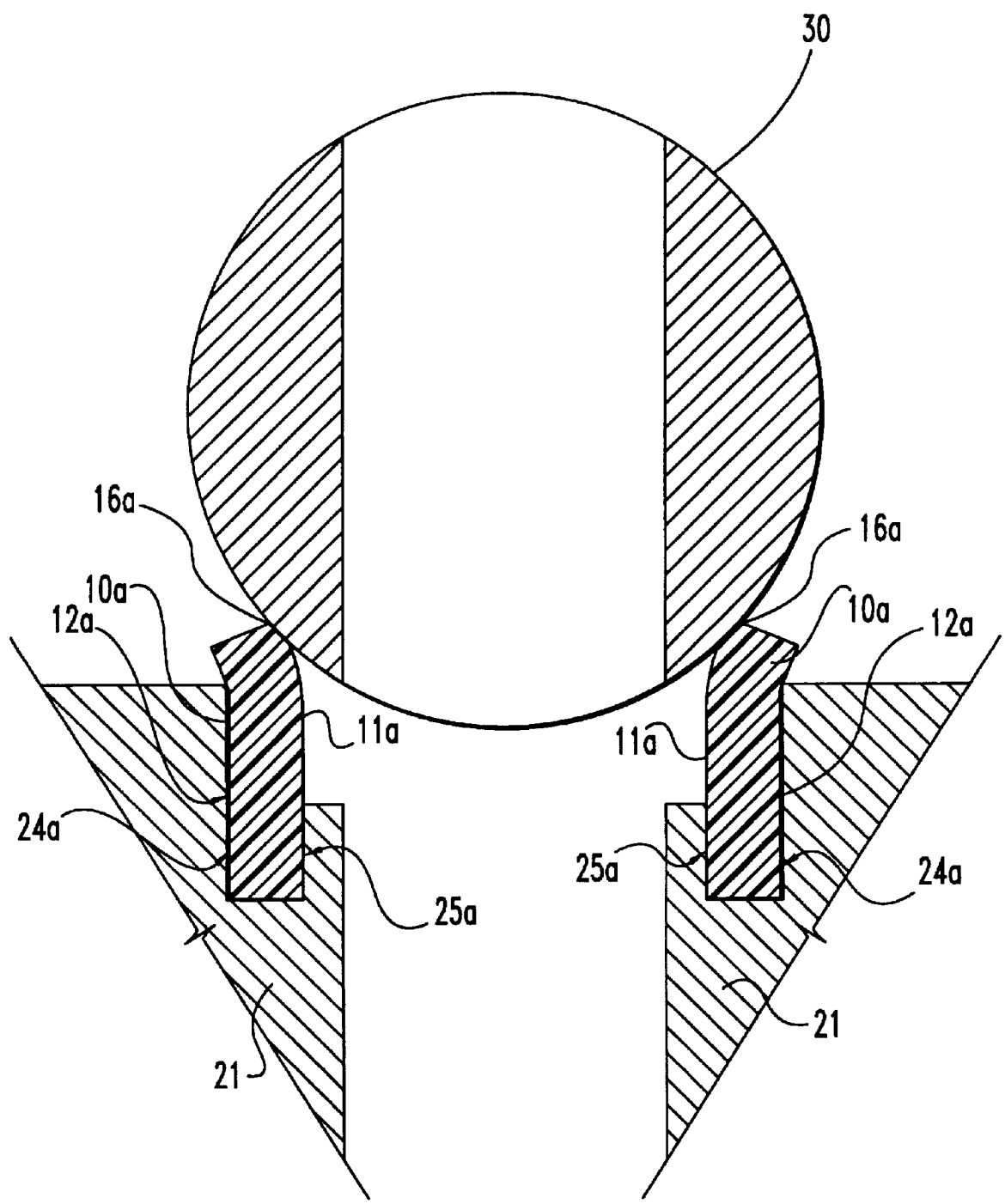
FIG. 11 is a partial view of the valve apparatus of FIG. 7 after the assembly of the valve apparatus.
Figure 12:
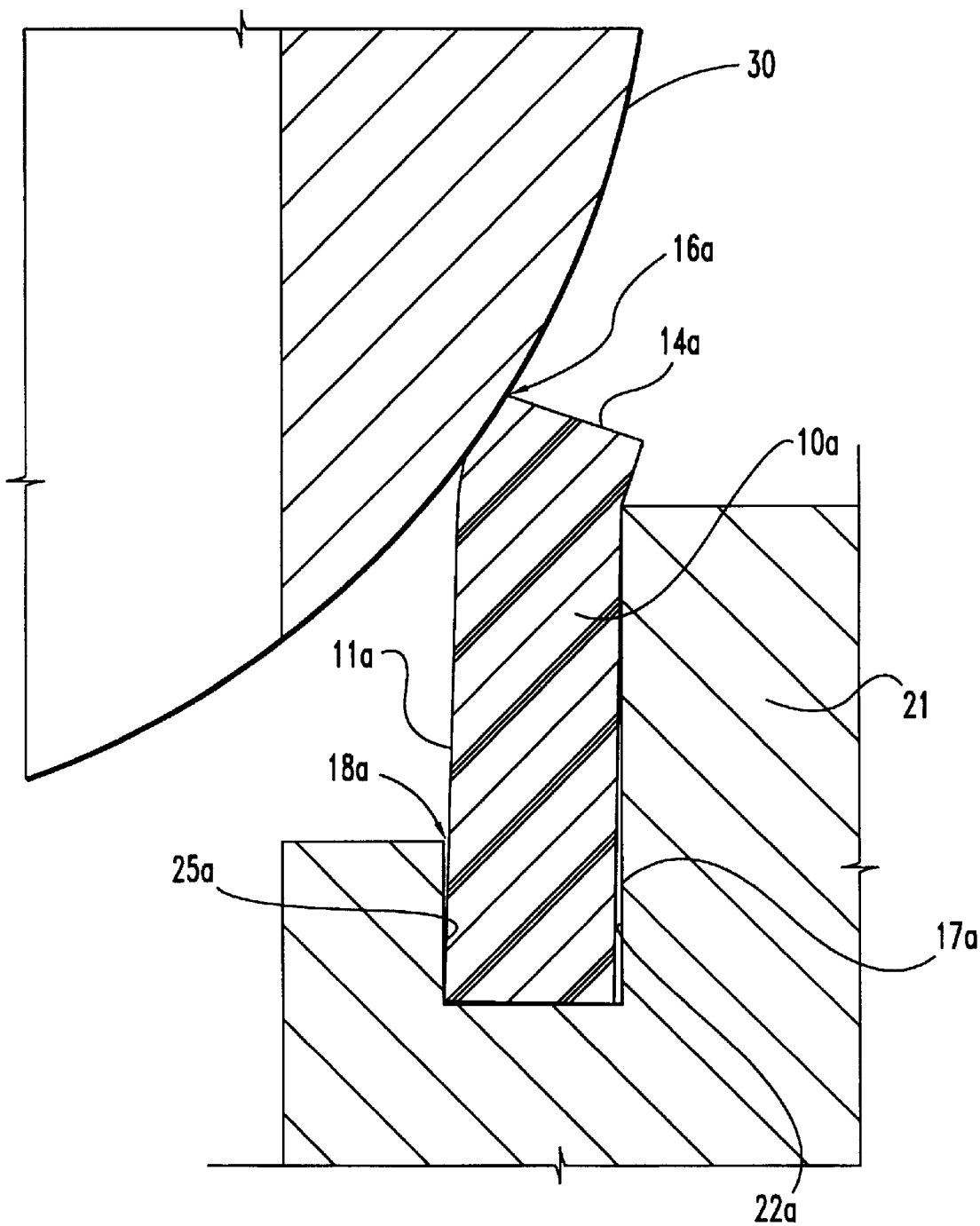
FIG. 12 is a zoom-in view of FIG. 11.

FIGS. 11 and 12 are illustrative of a second essential step in assembling valve apparatus 20. FIG. 11 is a cross-sectional view of inner diameter surface 11a of annular valve seat 10a conforming to valve ball 30, while FIG. 12 is a zoom-in view of FIG. 11. Referring back to FIG. 10, the present invention contemplates that a measurement of a height 12H of surface 12a of annular valve seat 10a can be greater than a measurement of a height 24H of wall 24a of annular valve body seat pocket 22a. The measurement of height 12H of surface 12a is designed and manufactured to be greater than the designed and manufactured measurement of height 24H of wall 24a. This is advantageous for several reasons. First, annular valve seat 10a will flare as valve ball 30 is forced down on second inner diameter corner 16a, and this flaring exposes inner diameter surface 11a to valve ball 30, and as a result, facilitates inner diameter surface 11a in conforming to valve ball 30. Second, because annular valve seat 10a is a cylindrical section contained in a seat pocket, annular valve seat 10a will want to return to its original shape. The force provided by annular valve seat 10a in attempting to return to its original shape energizes the intimate contact between the inner diameter surface 11a and valve ball 30. Finally, as annular valve seat 10a flares, first inner diameter corner 15a of annular valve seat 10a will wedge against inner wall 25a of annular valve body seat pocket 22a. The force used by first inner diameter corner 15a in wedging against inner wall 25a is opposed by an equal counterforce from inner wall 25a. This interaction of the force and counterforce further energizes the intimate contact between inner diameter surface 11a and valve ball 30. Referring to FIG. 12, gap 17a and a gap 18a are demonstrative of inner diameter corner 15a wedging against inner wall 25a of annular valve body seat pocket 22a.

While FIGS. 11 and 12 are directed to annular valve seat 10a and annular valve body seat pocket 22a, FIGS. 11 and 12 apply equally to annular valve seat 10b and annular valve body seat pocket 22b.

Figure 13:
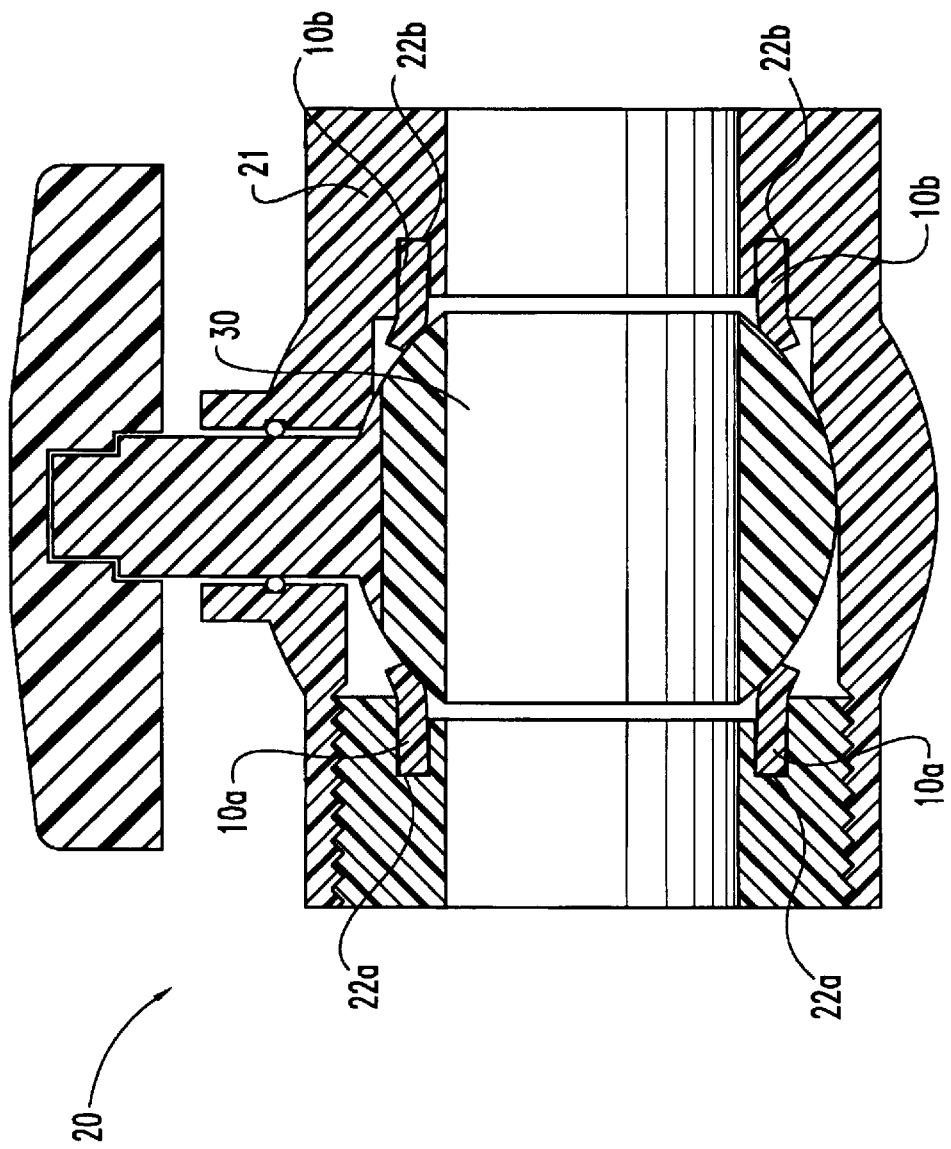
FIG. 13 is a view of the valve apparatus of FIG. 7 after assembly of the valve apparatus.

FIG. 13 is a cross-sectional view of an assembled valve apparatus 20 in accordance with the present invention. At this point, several comments should be made. First, FIGS. 6 through 13 include a generic drawing of a valve body 21. The present invention contemplates that the shape and size of valve body 21 may vary. Second, FIGS. 6 and 13 illustrate the annular valve seats 10a, annular valve seat 10b, and valve ball 30 being sealed as valve body 21 is screwed together. However, the present invention contemplates that valve apparatus 20 may be assembled in accordance with the present invention by any means. Finally, the present invention does not contemplate a fixed mathematical relationship among and between the dimensions of annular valve seat 10a, annular valve seat 10b, valve ball 30, annular valve body seat 22a and annular valve body seat 22b. Tests on an assembled valve apparatus 20 in accordance with the present invention demonstrate that a matched seal can be created and energized over a wide range of dimensions for each component of valve apparatus 20.

It can be appreciated that the present invention creates and energizes a seal between a valve ball and an annular valve ball seat, and eliminates the necessity of secondary machining of the annular valve ball seat. It can be appreciated that the present invention further eliminates the necessity of o-ring energizers, springs, and/or other components. While the present invention has been illustrated and described in detail in the drawings and foregoing description, the same is to be considered as illustrative and not restrictive in character, it being understood that only the preferred embodiment has been shown and described and that all changes and modifications that come within the spirit of the present invention are desired to be protected.

What is claimed is:

1. The method of assembling a valve apparatus including a valve ball, a valve body having an annular valve body seat pocket, and an annular valve seat, said method comprising the steps of:

designing and manufacturing the annular valve body seat pocket to have a floor, an inner wall intersecting said floor to form an inner corner, and an outer wall intersecting said floor to form an outer corner;

designing and manufacturing the annular valve seat to have an inner diameter surface, an outer diameter surface, and a bottom side surface intersecting said inner diameter surface to form a lower inner diameter corner and intersecting said outer diameter surface to form a lower outer diameter corner, wherein a radius of said lower inner diameter corner of the annular valve seat approximates a radius of said inner corner of the annular valve body seat pocket, and wherein a radius of said lower outer diameter corner of the annular valve seat is less than a radius of said outer corner of the annular valve body seat pocket;

seating said annular valve seat into the annular valve body seat pocket, wherein said lower inner diameter corner of the annular valve seat engages said inner corner of the annular valve body seat pocket, and wherein said lower outer diameter corner of the annular valve seat is spaced from said outer corner of the annular valve body seat pocket;

conforming said inner diameter surface of the annular valve seat to the valve ball by forcing the valve ball against the annular valve seat; and levering the annular valve seat by forcing the valve ball against the annular valve seat, wherein said lower inner diameter corner disengages from said inner corner of the annular valve body seat pocket to wedge against said inner wall of the annular valve body seat pocket.

2. The method of claim 1 wherein said levering of the annular valve seat causes said lower outer diameter corner to wedge against said floor of the annular valve body seat pocket.

3. The method of claim 1 further comprising a step of designing and manufacturing the valve ball to be substantially harder than the annular valve seat.

4. The method of claim 1 wherein the annular valve seat is further designed and manufactured to have a top surface intersecting said inner diameter surface to form an upper inner diameter corner.

5. The method of claim 4 further comprising a step of positioning the valve ball on said upper inner diameter corner of the annular valve seat prior to conforming said inner diameter surface of the annular valve seat to the valve ball, wherein a radius of said upper inner diameter corner is designed and manufactured to ensure that the valve ball can be positioned on said upper inner diameter corner.

6. The method of claim 1 wherein the annular valve seat is further designed and manufactured to have a height that is greater than a height of the annular valve body seat pocket.

7. The method of assembling a valve apparatus including a valve ball, a valve body having an annular valve body seat pocket, and an annular valve seat, said method comprising the steps of:

designing and manufacturing the annular valve body seat pocket to have an inner wall and an outer wall opposing said inner wall;

designing and manufacturing the annular valve seat to have an inner diameter surface, and an outer diameter surface opposing said inner diameter surface, wherein a radius of said inner diameter surface of the annular valve seat approximates a radius of said inner wall of the annular valve body seat pocket, and wherein a radius of said outer diameter surface of the annular valve seat is less than a radius of said outer wall of the annular valve body seat pocket;

seating said annular valve seat into the annular valve body seat pocket, wherein a lower halve of said inner diameter surface of the annular valve seat abuts said inner wall of the annular valve body seat pocket, and wherein said outer diameter surface of the annular valve seat is spaced from said outer wall of the annular valve body seat pocket;

conforming said inner diameter surface of the annular valve seat to the valve ball by forcing the valve ball against the annular valve seat; and levering the annular valve seat by forcing the valve ball against the annular valve seat, wherein a portion of said lower halve of said inner diameter surface of the annular valve seat is spaced from said inner wall of the annular valve body seat pocket.

8. The method of claim 7 wherein said levering of the annular valve seat causes a portion of said outer diameter surface of the annular valve seat to abut said outer wall of the annular valve body seat pocket.

9. The method of claim 7 further comprising a step of designing and manufacturing the valve ball to be substantially harder than the annular valve body seat.

10. The method of claim 7 wherein the annular valve seat is further designed and manufactured to have a top surface intersecting said inner diameter surface to form an upper inner diameter corner.

11. The method of claim 10 further comprising a step of positioning the valve ball on said upper inner diameter corner of the annular valve seat prior to conforming said inner diameter surface of the annular valve seat to the valve ball, wherein a radius of said upper inner diameter corner is designed and manufactured to ensure that the valve ball can be positioned on said upper inner diameter corner.

12. The method of claim 7 wherein the annular valve seat is further designed and manufactured to have a height that is greater than a height of the annular valve body seat pocket.

13. The method of assembling a valve apparatus including a valve ball, a valve body having an annular valve body seat pocket, and an annular valve seat, said method comprising the steps of:

designing and manufacturing the annular valve body seat pocket to have an inner wall and an outer wall opposing said inner wall;

designing and manufacturing the annular valve seat to have an inner diameter surface, and an outer diameter surface opposing said inner diameter surface, wherein a radius of said inner diameter surface of the annular valve seat approximates a radius of said inner wall of the annular valve body seat pocket, and wherein a radius of said outer diameter surface of the annular valve seat is less than a radius of said outer wall of the annular valve body seat pocket;

seating said annular valve seat into the annular valve body seat pocket, wherein a lower halve of said inner diameter surface of the annular valve seat abuts said inner wall of the annular valve body seat pocket, and wherein said outer diameter surface of the annular valve seat is spaced from said outer wall of the annular valve body seat pocket;

conforming said inner diameter surface of the annular valve seat to the valve ball by forcing the valve ball against the annular valve seat; and levering the annular valve seat by forcing the valve ball against the annular valve seat, wherein a portion of said outer diameter surface of the annular valve seat abuts said outer wall of the annular valve body seat pocket.

14. The method of claim 13 wherein said levering of the annular valve seat causes a portion of said lower halve of said inner diameter surface of the annular valve seat to be spaced from said outer wall of the annular valve body seat pocket.

15. The method of claim 13 further comprising a step of designing and manufacturing the valve ball to be substantially harder than the annular valve body seat.

16. The method of claim 13 wherein the annular valve seat is further designed and manufactured to have a top surface intersecting said inner diameter surface to form an upper inner diameter corner.

17. The method of claim 16 further comprising a step of positioning the valve ball on said upper inner diameter corner of the annular valve seat prior to conforming said inner diameter surface of the annular valve seat to the valve ball, wherein a radius of said upper inner diameter corner is designed and manufactured to ensure that the valve ball can be positioned on said upper inner diameter corner.

18. The method of claim 13 wherein the annular valve seat is further designed and manufactured to have a height that is greater than a height of the annular valve body seat pocket.

* * * * *